Sept. 22, 1942. J. B. OLSON 2,296,481
ANTIWING SHOLDER STANCHION
Filed Feb. 2, 1940 2 Sheets-Sheet 1
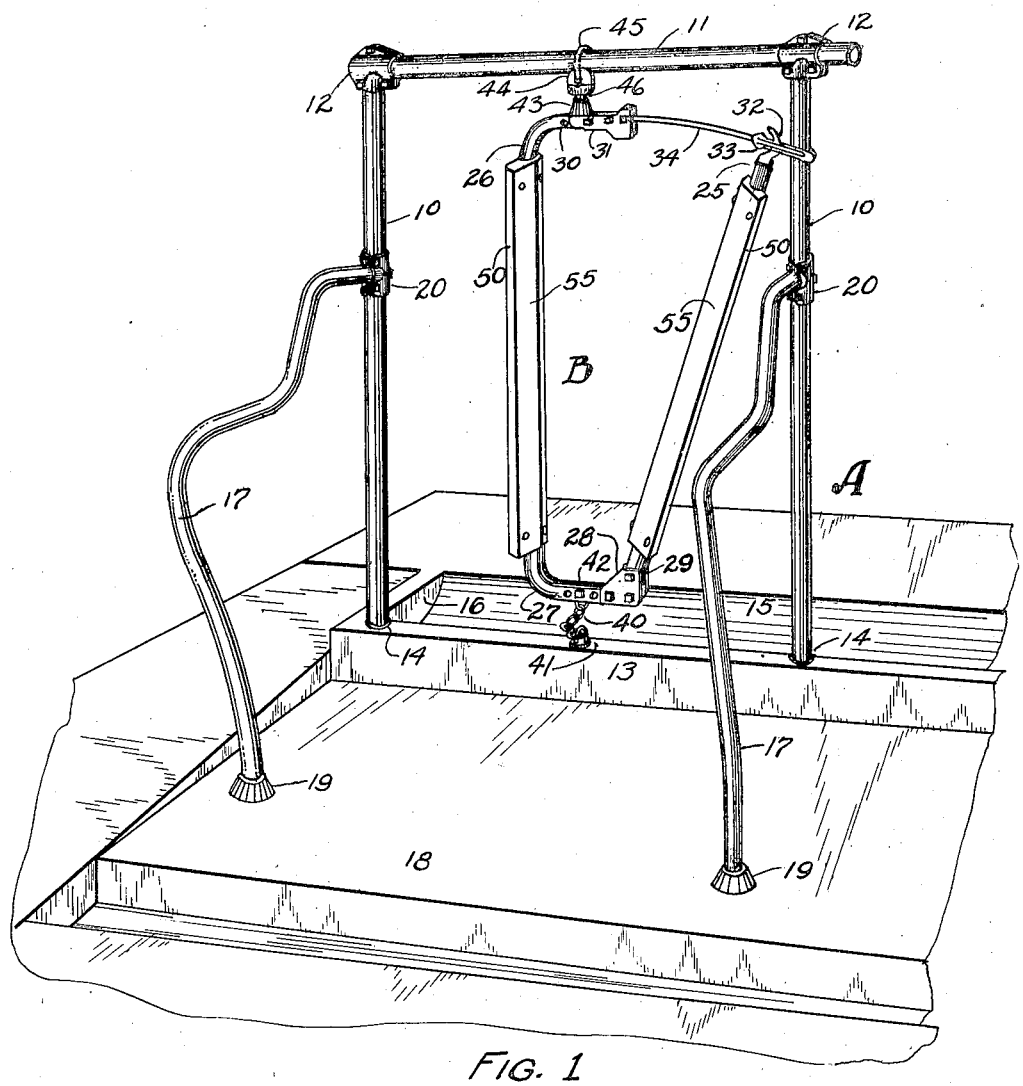
FIG. 1
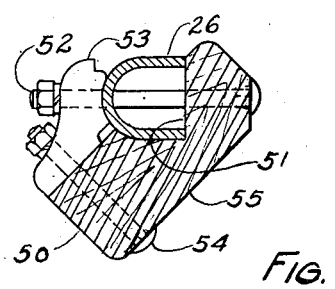
FIG. 2
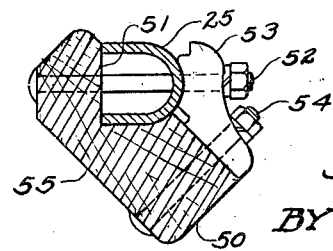
INVENTOR
JOHN B. OLSON
BY
ATTORNEY Sept. 22, 1942.   J. B. OLSON   2,296,481
ANTIWING SHOLDER STANCHION
Filed Feb. 2, 1940   2 Sheets-Sheet 2

INVENTOR
JOHN B. OLSON
BY  *A. S. Kroh*
ATTORNEY

Patented Sept. 22, 1942

2,296,481

UNITED STATES PATENT OFFICE 2,296,481

ANTIWING SHOULDER STANCHION

John B. Olson, Fort Atkinson, Wis., assignor to James Manufacturing Company, Fort Atkinson, Wis., a company of Wisconsin Application February 2, 1940, Serial No. 316,917

5 Claims. (Cl. 119—150)

The present invention relates to an improvement in stanchions for use principally in connection with dairy stalls.

One of the objects of the invention is to provide a stanchion without the objectionable feature which has only recently been discovered as the cause of what is called wing shoulders.

There are many objectionable features to a rope, chain or leather halter, the use of which has largely disappeared on the larger dairy farms. However, a situation has recently developed which has prompted many dairymen to discard their stanchions and go back to the use of the old style halter.

A stanchion comprises two vertical bars suitably spaced so they loosely contact the animal's neck adjacent the shoulder. One of the bars at its bottom is hinged to the horizontal portion of the other bar whereby it can be swung open from the top for obvious reasons. The stanchions are held to the stall in a manner so the animal has freedom of neck and head movement while standing or lying down.

The feed for the animals is placed in a trough in front of the stanchion and while eating, the animals generally press forward so there is considerable presure of the stanchion bars against the animal's shoulders.

Stanchion bars in the past have been relatively small in cross section and the contact surface, if of any width, is transverse to the stall.

The constant pressure against the inner part of the animal's shoulders has brought about what is now generally termed "wing shoulders." The trouble has reached the status of a disease and is considered serious enough by some dairymen to prompt them to dismantle their stanchions and use halters which, for obvious reasons have never been satisfactory.

The present invention prevents wing shoulders and, if used early enough, will actually move wing shoulders back to their normal position.

As will hereinafter appear, my device prevents and cures wing shoulders and accomplishes these desired results by the use of specially designed stanchion bars or by attaching my improvement to the conventional stanchion bars.

To these and other useful ends, my invention consists of parts, combinations of parts, or their equivalents, and mode of operations, as hereinafter set forth and claimed and shown in the accompanying drawings in which:

Fig. 1 is a perspective drawing of a dairy stall equipped with my invention, illustrating the stanchion in its released or open position.

Fig. 2 is a sectional view of the stanchion bars taken on lines 2—2 of Figure 3.

Figure 4:
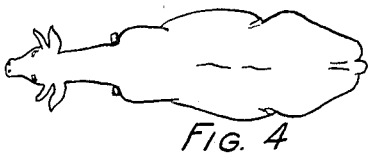
Fig. 4 is a top diagrammatic drawing of an animal and a section through a conventional stanchion bar illustrating the shape of the animal's shoulders after an extended period of time.

As thus illustrated, in Figure 1, the stall in its entirety is designated by reference character A and the stanchion in its entirety, is designated by reference character B.

The stall posts are designated by numerals 10—10, the top rail by numeral 11 and being secured to the top of the posts by brackets 12—12. Posts 10 are mounted on the rear rail 13 of the feed trough as at 14, the trough having front wall 15 and end walls 16 (one not shown). Numerals 17—17 designate the stall rails, each side being secured to the concrete floor 18 as at 19—19 and to posts 10 as at 20—20.

Thus I have shown and briefly described a conventional stall. The stanchion B illustrated in Figures 1, 2 and 3, in some respects, is conventional. For example, it comprises side bars 25 and 26.

The lower end of member 26 is L-shaped as at 27 having secured to the end a bracket 28 which is hinged to member 25 as at 29. Member 26 has another L extension 30 and secured to its end is a bracket 31. A bracket 32 is secured to the upper end of member 25 having a latch 33 which is adapted to engage member 31 and hold it in the position shown in Figure 3 unless manually released.

An arm 34 is secured at one end to bracket 32 and being slidably embraced by bracket 31. This arm is provided with an upturned end 35 and its body portion is curved on a radius with pivot 29 thus the top of member 25 may move outwardly to the position shown in Figure 1.

Member 27 is secured to member 13 by means of a chain 40 as at 41 and 42. Member 31 is hingedly and swingingly secured to member 11 by means of an extension 43 on member 31 and a bracket 44 which in turn is secured to member 11 by means of a U bolt 45. A ball joint forms a loose or universal joint between members 43 and 44 as at 46 thus clearly the stanchion when closed may turn horizontally in either direction and the lower end can swing to a limited extent in any direction.

Figure 5:
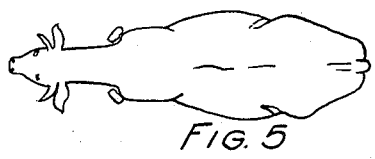
Fig. 5 illustrates diagrammatically a view similar to Figure 4 except the stanchion has been equipped with my invention.
Figure 6:
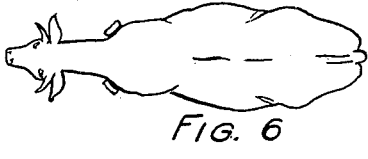
Fig. 6 illustrates diagrammatically the animal shown in Figure 5 but after using my invention for a considerable time or illustrating how my stanchion fits the shoulders of a normal animal.

Clearly the animal, when stanchioned as illustrated in Figures 4, 5 and 6 has limited freedom of movement and can turn the head to the right or left the same as if freed from the stanchion or if tied to the stall by means of a halter.

Figure 3:
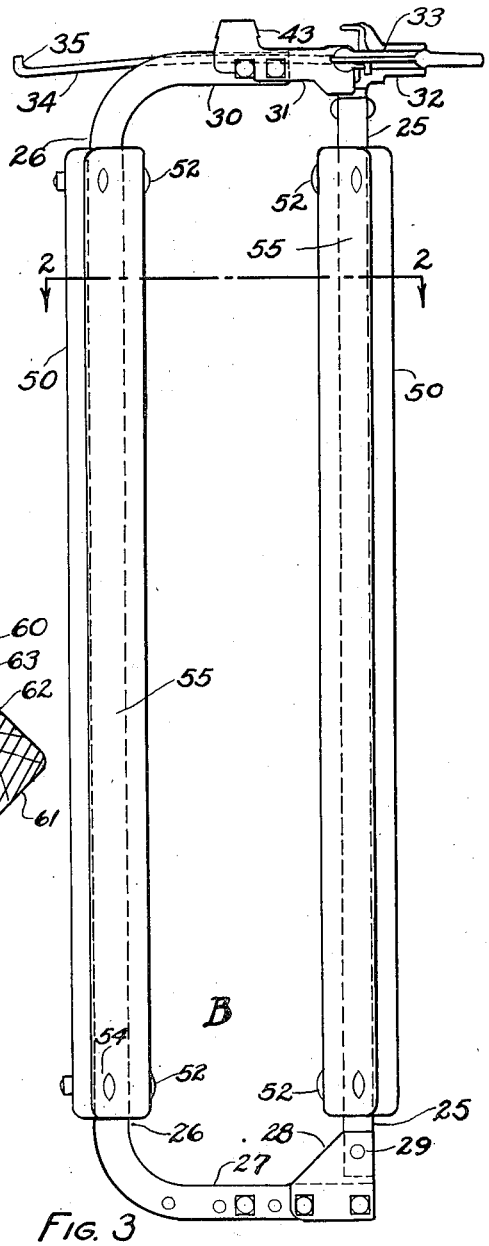
Fig. 3 is an elevational view of the stanchion shown in Figure 1 but in its closed position.

It will be understood that members 25 and 26 are positioned normally as illustrated in Figure 3. When bars 25 and 26 are not equipped with my invention and the animals are eating, they press forwardly against the stanchion bars and with any conventional bars this pressure in time will dislocate the shoulders as illustrated in Figure 4 causing what is generally termed wing shoulders. I remedy this trouble in the following manner:

In Figures 1 and 2 I illustrate the preferred form of my stanchions wherein wood strips 50—50 are grooved as at 51 so as to fit members 25 and 26 as illustrated and being held to these members by means of bolts 52—52 and brackets 53 through which bolts 52 extend.

Brackets 53 extend rearwardly forming a seat for the front side of members 50 and being held thereto by means of bolts 54. The front inner surfaces 55 of member 50 are positioned at an angle about as illustrated so their faces will match the shoulder surfaces of a normal animal as illustrated in Figure 6 thus the forward pressure will not dislocate the shoulders as illustrated in Figure 4.

Figure 7:
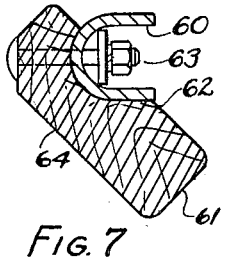
Fig. 7 is a transverse sectional view of a modification.

In Figure 7 I illustrate a modification wherein the flanges 60 of the stanchion bars extend outwardly and the wood strip 61 is grooved as at 62 so as to fit the bar as illustrated and being held to the bar by means of bolts 63. The face 64 of member 61 is positioned at the normal shoulder angle.

Figure 8:
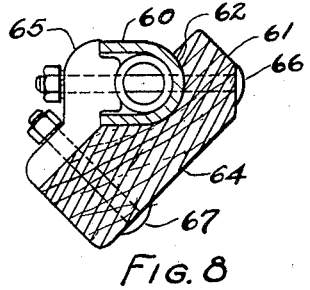
Fig. 8 is a transverse sectional view similar to Figure 7 but of a further modification.

In Figure 8, I illustrate a modification of Figure 7 wherein a bracket 65 is made use of to strengthen the fastening of strip 61 to the stanchion bar. This assembly is held together by means of bolts 66 and 67.

It seems wing shoulder is a chronic disease and that even if an animal with wing shoulders is tied to the stall with a rope or halter the wing shoulder does not disappear. With my invention, if an animal has been held by a standard stanchion long enough to cause wing shoulder and then tied to a stanchion with my invention as illustrated in Figure 5, in time the wing shoulders disappear because my strips gradually press the shoulders back into normal shape.

Clearly my wood strips may be secured to steel stanchions of any design and there strips may be positioned to present whatever contact angle is necessary to fit the normal shoulders of the animal.

It will be seen that my device will prevent and cure wing shoulder and that it may easily be applied to any form of stanchion. This is an important feature of my device because many users are abandoning conventional stanchions. With my device, this expensive equipment can be utilized at small expense.

Having thus shown and described my invention, I claim:

1. A stanchion having normally spaced and normally vertically positioned side bars, said side bars comprising metal supporting bars and non-metal strips rigidly secured to the inner sides thereof, said non-metal strips having substantially flat inner surfaces which diverge rearwardly and having a width and angle to thereby fit the major part of the width of the shoulders of a normal animal.

2. A stanchion of the class described, comprising spaced vertically positioned side bars, said side bars comprising metal supporting members and non-metal strips rigidly secured to the adjacent and rear sides thereof, said non-metal strips having animal shoulder contact surfaces of considerable width which diverge rearwardly to thereby fit the major part of the width of the shoulders of a normal animal, said non-metal strips being removably secured to said bars by means of bolts and rear supporting brackets through which the bolts extend, said brackets extending rearwardly forming a seat for the rearward portion of said strips and being secured thereto by means of bolts.

3. A stanchion having normally spaced and normally vertically positioned side bars, said side bars comprising metal supporting bars and wood strips rigidly secured to and positioned adjacent the inner sides thereof, the inner surfaces of said wood strips being substantially flat and diverging rearwardly, and having a width substantially equal to the width of the shoulders of a normal animal and being at an angle to thereby fit the shoulders of a normal animal.

4. A stanchion of the class described, comprising normally spaced and vertically positioned side bars, each side bar having a shoulder contacting surface of such area as to contact the adjacent shoulder of an animal within the stanchion throughout substantially the entire width of said shoulder, the opposing surfaces being at such an angle as to correspond to the angle formed by intersecting planes of the animal's shoulders.

5. A stanchion of the class described, comprising normally spaced and vertically positioned side bars, each side bar having a wooden shoulder contacting surface of such area as to contact the adjacent shoulder of an animal within the stanchion throughout substantially the entire width of said shoulder, the opposing surfaces being at such an angle as to correspond to the angle formed by intersecting planes of the animal's shoulders.

JOHN B. OLSON.